A. R. SMITH.
Mill Bolt.
No. 60,073.
2 Sheets—Sheets 1.
Patented Nov. 27, 1866.
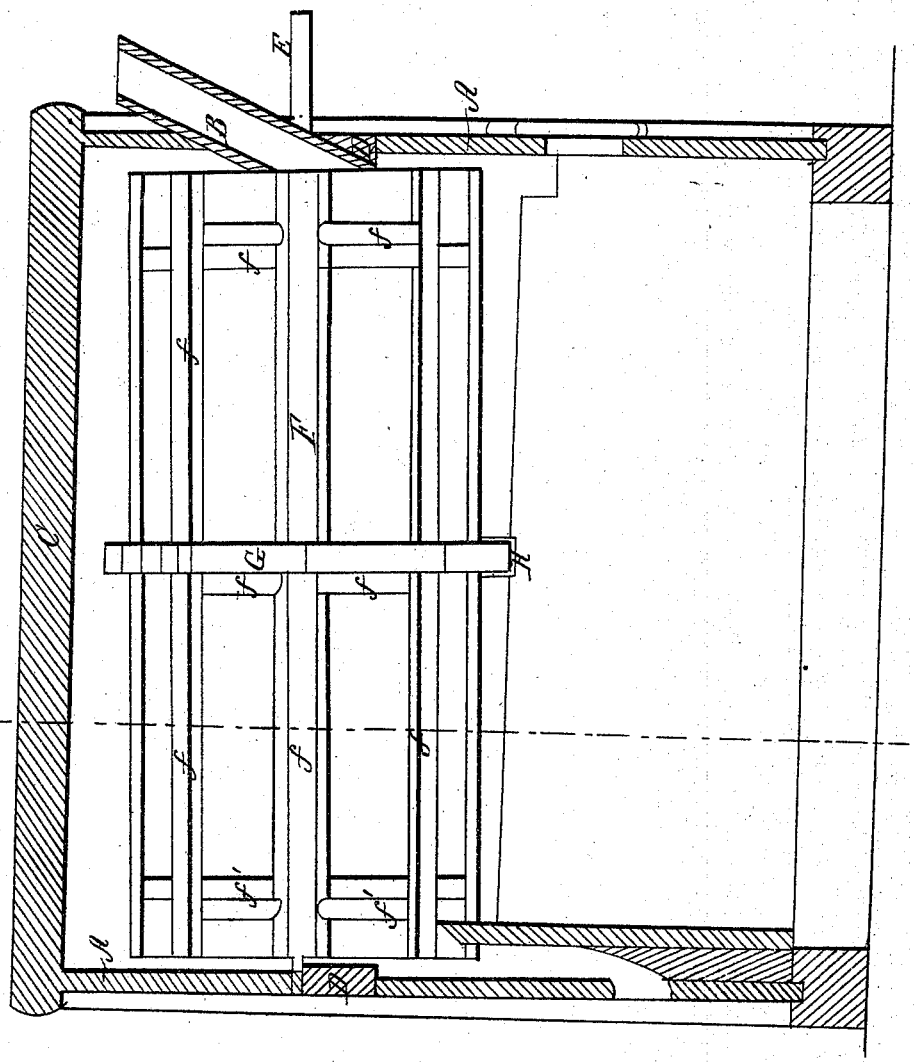
Witnesses,
Edward H. Knight.
Solon C. Kemon.
Inventor,
A. R. Smith
per Munn & Co.
Attorneys

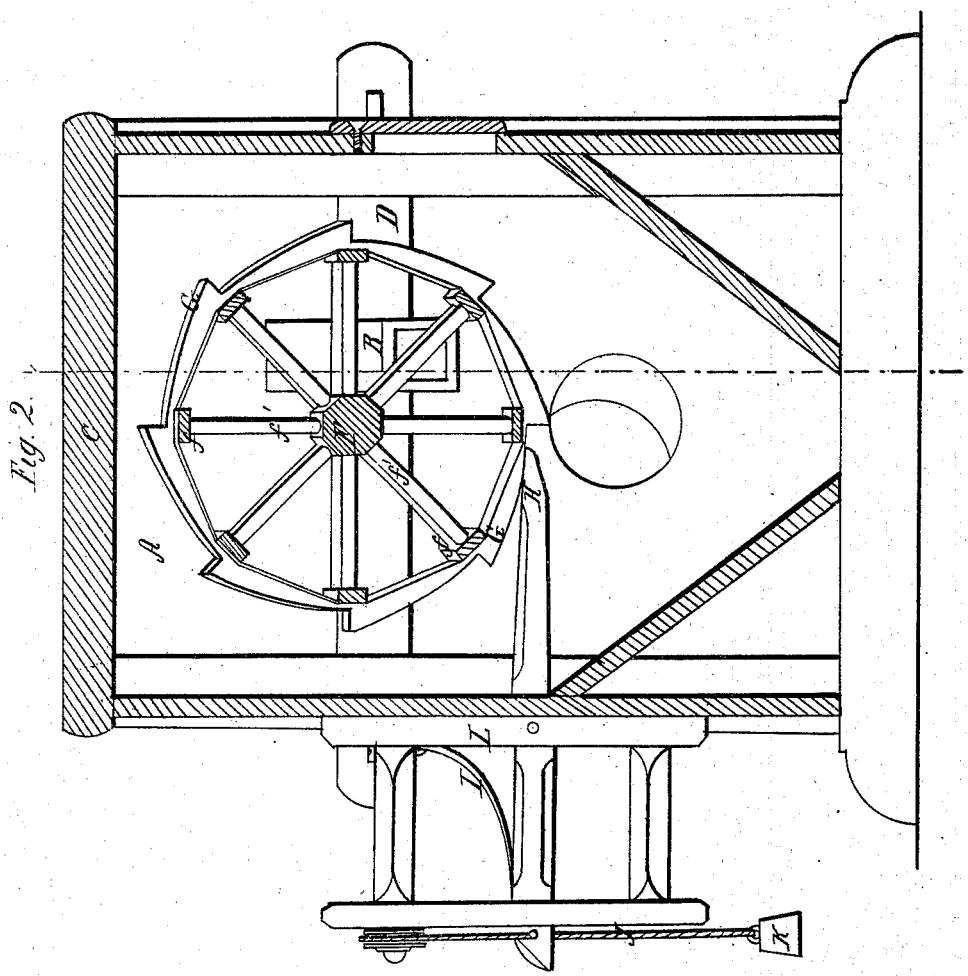

United States Patent Office.

IMPROVEMENT IN FLOUR BOLTS.

A. R. SMITH, OF DELAWARE, OHIO.

Letters Patent No. 60,073, dated November 27, 1866.

SPECIFICATION.

TO ALL WHOM IT MAY CONCERN:

Be it known that I, A. R. SMITH, of Delaware, in the county of Delaware, and State of Ohio, have invented a new and improved Knocker for Flour Bolts; and I do hereby declare the following to be a full, clear, and exact description of the same, sufficient to enable one skilled in the art to which the invention appertains to make use of it, reference being had to the accompanying drawings which form a part of this specification, and in which my invention is represented by—

Figure 1, a vertical longitudinal section.
Figure 2 is a vertical transverse section.

The knocker is a pivoted spring lever, which is vibrated by a succession of teeth on the frame of the bolt, and caused to snap sharply against the same as it is released from the tooth, by this means jarring the flour from the meshes of the bolt and expediting its action. By this mechanical appliance, a given amount of bolting may be performed with a smaller surface of cloth; many bolts, inadequate for duty placed upon them, may be made perfectly efficient, and the capacity of other bolts increased.

In the drawings, A is the case, B the hoppering, C the cover, and D the bridge-tree which supports the shaft E of the reel F, which is built in the usual manner, of heads $f$ and spokes $f'$. To one of the octagonal pieces, $f$, are attached the knocker-blocks, G, which collectively form a circle of ratchet teeth, against which the knocker, H, impinges as the reel revolves. The knocker, H, is pivoted to the frame at $h$; its inner end is in contact with the knocker-blocks, and its outer end is depressed by a spring, I, whose effective force is regulated by a cord and weight, J K, which tend to raise the outer end of the lever, and to that extent act in diminution of the power of the spring. The lever works in the frame L, on the outside of the machine, and as the reel is revolved, the knocker-blocks depress it, and then release it, causing it to strike on the reel and jar the flour from the meshes of the cloth. The knocker-blocks are put on the consecutive ribs of the reel, and the knocker applied below, which is the most effective position, though it may be adapted to the side or top. The knocker is especially effective while grinding soft or damp wheat, which causes the meshes of the bolting-cloth to become quickly clogged.

In governing bolts with my knocker, the cord which is attached to the lever passes from the lever through a pulley above, on the frame, and from thence extends down to the grinding floor, and there is regulated by the miller, from the heaviest stroke to the lightest tap of the lever, or it can be stopped entirely, at the discretion of the miller. The usual mode of regulating bolts is by the increase or decrease of the feed on the stone. With my knocker this difficulty is obviated, as the same feed, or the regular feed, can be retained on the stone, and the bolts can be regulated by the knocker, so that it really acts as a bolt governor. In case where there are two or more reels, one above another, on the same side of the bolting-chest, and when one revolves to the right and the other to the left, which they frequently do, the knocker-blocks of one reel are reversed, and a raised piece is put on the end of the lever, where it comes in contact with the knocker-blocks, of about four inches long and two inches thick, or thick enough to clear the shoulder of the knocker, from the arm of the lever. The knocker-blocks may have the thin end mortised into the thick end or shoulder of the block, which makes it self-sustaining and strengthens the keel.

Having described my invention, what I claim as new, and desire to secure by Letters Patent, is—

The reel F, provided with knocker-blocks, or a circular series of projections around it, from rib to rib, in combination with a pivoted spring lever, operating substantially as described.

A. R. SMITH.

Witnesses:
GEORGE KEILER,
FRANKLIN MILLER.